MEANS FOR MAINTAINING SPACING OF A MAGNETIC TRANSDUCER
FROM A ROTARY MAGNETIC DRUM
Filed Dec. 5, 1961

INVENTOR
JOHANNES A. VAN LAMMEREN.
HERRE RINIA.
LEOPOLD M.L.J. LEBLANS
BY
AGENT

United States Patent Office

3,172,962
Patented Mar. 9, 1965

3,172,962

MEANS FOR MAINTAINING SPACING OF A MAGNETIC TRANSDUCER FROM A ROTARY MAGNETIC DRUM

Johannes Antonius van Lammeren, Aalst-Waalre, and Herre Rinia and Leopold Michael Lambert Joseph Leblans, Emmasingel, Eindhoven, Netherlands, assignors to North American Philips Company, Inc., New York, N.Y., a corporation of Delaware Filed Dec. 5, 1961, Ser. No. 157,222
Claims priority, application Netherlands, Dec. 7, 1960, 258,786
4 Claims. (Cl. 179—100.2)

This invention relates generally to a device for maintaining spacing of a magnetic transducer from a rotary magnetic drum. Such a device is disclosed, for example, in U.S. patent application Serial No. 91,368, filed February 24, 1961, and assigned to the assignee of the instant application. Briefly, in the co-pending application, a device is described for use in combination with a magnetic storage drum, on which information is recorded or scanned with the aid of a magnetic head floating on a thin film of fluid at a small distance from the drum, the device comprising mechanical means preventing the head from coming into contact with the drum when the film of fluid decreases or is not present.

The mechanical means described in the said co-pending application for preventing the head from engaging the drum, comprises a lever pivotable about a spindle extending parallel to the axis of the drum, the lever being arranged to exert pressure on the head or head holder when the thickness of the film is insufficient, and wherein, when the thickness of the film is sufficient, the film causes the lever to pivot. At the end more remote from the head, the lever is widened and influenced by the centrifugal force of the film of air induced along the circumference of the drum owing to its great speed.

The invention has for its object to provide an improved device of the above kind; according to one aspect of the invention, the said mechanical means substantially comprises a bellows-shaped member and a tube connected to the interior thereof, the open end of the tube disposed adjacent the drum circumference and being shaped and directed so that part of the air film induced by rapid rotation of the drum is blown through the tube into the bellows-shaped member.

In order that the invention may be readily carried into effect, it will now be described, by way of example, with reference to two embodiments shown in the accompanying diagrammatic drawings.

Figure 1:
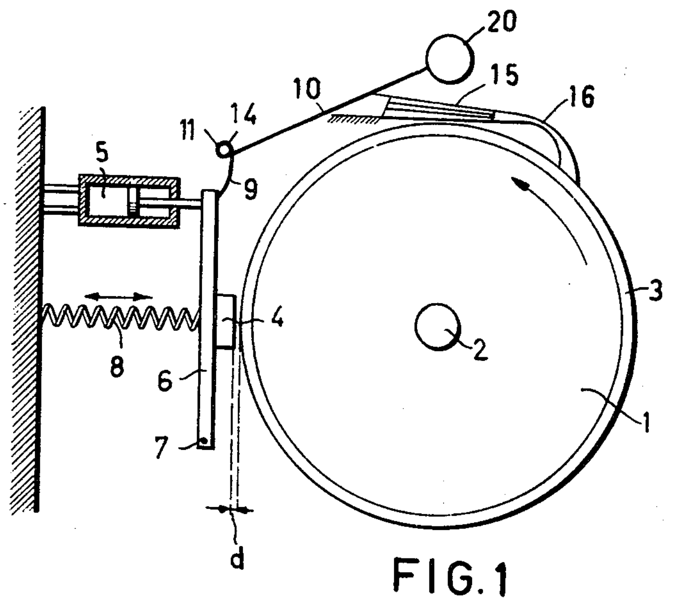

In FIGURE 1, a magnetic storage drum 1 is capable of revolving on a shaft 2. A magnetic layer 3 is provided on the periphery of the drum and a head 4 is arranged near the drum. The construction is such that when the drum rotates at the correct speed, the head "floats on air." For this purpose, the head 4 is secured to a head holder 6 pivoting about a fulcrum 7. The film of air produced by the rotation of the drum pushes the head away from the drum against the pressure of a spring 8 and maintains a certain spacing between the head and the revolving drum (that is to say, "the head floats on air"). By optical means, i.e., by projecting a light beam through the gap, it has been found that the spacing *d* does not exceed 1 micron. An oil damper 5 safeguards the head against vibration without preventing it from following slow variations (due to changes in temperature).

Additional measures are necessary to prevent the spring 8 from pushing the head onto the drum when the drum is stationary or rotates at too low a speed or is running down. For this purpose, a lever 9, 10 having a pivot point 11 is provided. When the drum rotates at too low a speed, the lever is in the position shown. The arm 10 of the lever bears on the movable upper edge of a bellows-like member 15, the lower edge of which is stationary, and which terminates in an open-ended tube 16 having a flaring end disposed in very close proximity to the drum periphery. When the drum revolves rapidly in the direction of the arrow, air from the induced air film is forced into the flare of the tube 16 and through this tube into the bellows 15, so that this bellows expands and its upper edge presses the arm 10 of the lever upward, the arm 9 releasing the holder 6 of the head 4.

Figure 2:
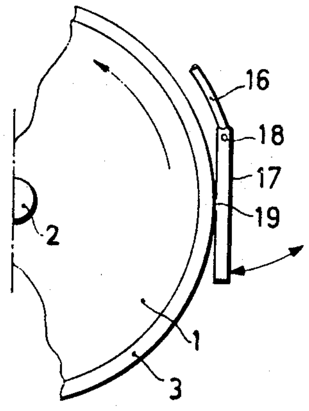

In the device shown in FIGURE 2, the tube 16 opens into a flat box-shaped chamber 17, one of the walls of which is tangential to the drum periphery in very close proximity thereto. This wall is provided with a slit 19 which coincides with the tangent. The chamber 17 is preferably capable of moving towards and away from the drum, for example pivotable about a shaft 18 extending parallel to the drum axis, as shown. The rocking movement about this shaft may be controlled by a screw for fine adjustment; this screw is not shown in the drawing.

A weight 20 may be secured, to the free end of the arm 10, so that no spring need be provided in the pivot point 11.

In the improved device described, the distance through which the controlling member, which in this case is the upper movable edge of the bellows 15, is adapted to move under the influence of the air film induced by the revolving drum, is greater than in the embodiment described in the above-noted co-pending application. Consequently, the control sensitivity is increased, providing a greater range of control.

While the invention has been described in connection with two embodiments, various changes and modifications will be readily apparent to those skilled in the art without departing from the inventive concept, the scope of which is set forth in the appended claims.

What is claimed is:

1. Recording and reproducing apparatus comprising in combination: a rotary magnetic storage drum adapted to rotate about a shaft, a magnetic transducer magnetically coacting with the surface of the drum, supporting means for supporting said transducer, bias means urging said transducer towards the drum surface, a stationary pivot point, a lever having two arms, said arms being pivoted about said pivot point, an expansible member having a fixed edge and a movable edge and at least one open end, said open end communicating and coacting with said fluid medium such that part of the fluid medium is forced into the expansible member through said open end when the drum is rotating, causing the movable edge to move when the drum is rotating, one of said arms resting on said movable edge, the other arm coacting with said supporting means and maintaining said transducer in a position away from the surface of the drum against the urging of said bias means when the lever is pivoted in response to a given decrease in the thickness of the fluid medium due to a decrease in the speed of rotation of the drum, said other arm becoming disengaged from said supporting means and allowing said bias means to urge said transducer towards the drum surface in response to a given increase in the thickness of the fluid medium due to an increase in the speed of rotation of the drum.

2. Recording and reproducing apparatus comprising in combination: a rotary magnetic storage drum adapted to rotate about a shaft, a magnetic transducer magnetically coacting with the surface of the drum, supporting means for supporting said transducer, bias means urging said transducer towards the drum surface, a stationary pivot point, a lever having two arms, said arms being pivoted about said pivot point, an expansible member having a fixed edge and a movable edge, an open-ended tube, one end of the tube communicating with the interior of the expansible member, the other end being positioned adjacent to and coacting with said fluid medium with part of the fluid medium being forced into the expansible member through the tube causing the movable edge to move when the drum is rotating, one of said arms resting on said movable edge, the other arm coacting with said supporting means and maintaining said transducer in a position away from the surface of the drum against the urging of said bias means when the lever is pivoted in response to a given decrease in the thickness of the fluid medium due to a decrease in the speed of rotation of the drum, said other arm becoming disengaged from said supporting means and allowing said bias means to urge said transducer towards the drum surface in response to a given increase in the thickness of the fluid medium due to an increase in the speed of rotation of the drum.

3. Recording and reproducing apparatus comprising in combination: a rotary magnetic storage drum adapted to rotate about a shaft, a magnetic transducer magnetically coacting with the surface of the drum, supporting means for supporting said transducer, bias means urging said transducer towards the drum surface, a stationary pivot point, a lever having two arms, said arms being pivoted about said pivot point, an expansible member having a fixed edge and a movable edge, an open-ended tube, one end of the tube communicating with the interior of the expansible member, the other end opening into a flat box-shaped member one of whose sides is tangential to the drum periphery, said one side having a slit therein which coincides with the tangent, part of said fluid medium being forced into the expansible member through the slit and the tube causing the movable edge to move when the drum is rotating, one of said arms resting on said movable edge, the other arm coacting with said supporting means and maintaining said transducer in a position away from the surface of the drum against the urging of said bias means when the lever is pivoted in response to a given decrease in the thickness of the fluid medium due to a decrease in the speed of rotation of the drum, said other arm becoming disengaged from said supporting means and allowing said bias means to urge said transducer towards the drum surface in response to a given increase in the thickness of the fluid medium due to an increase in the speed of rotation of the drum.

4. Apparatus as set forth in claim 3, wherein the tube is pivotally attached to the box-shaped member.

References Cited by the Examiner

UNITED STATES PATENTS 2,937,240 5/60 Harker -------------- 179—100.2

IRVING L. SRAGOW, *Primary Examiner.*

B. KONICK, *Examiner.*